July 7, 1959 — T. T. HUCKABEE — 2,893,879
COLD SMOKING FOOD PRODUCTS
Filed Feb. 19, 1958 — 2 Sheets-Sheet 1
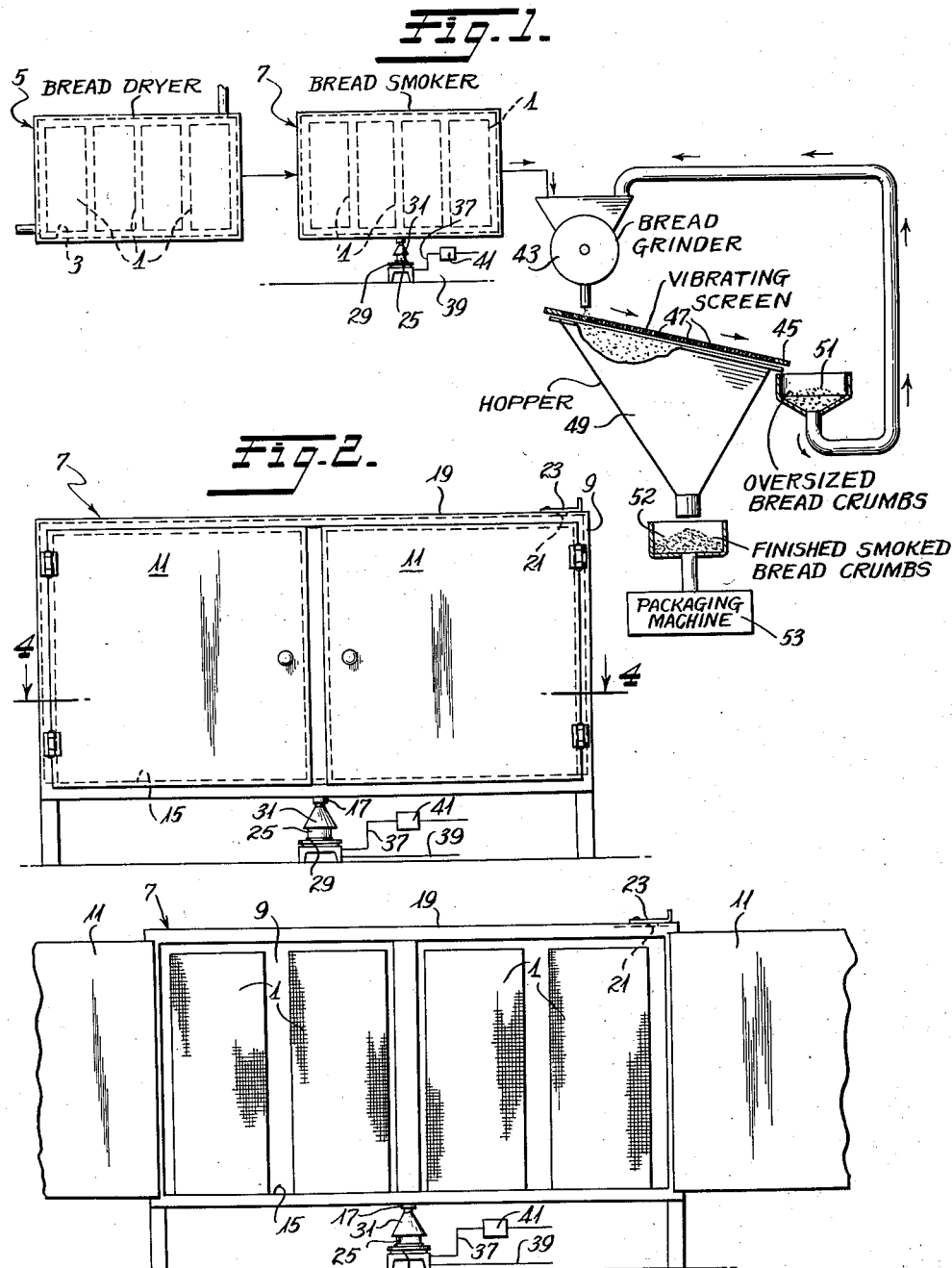
INVENTOR.
Thad T. Huckabee
BY
Bacon & Thomas
ATTORNEYS July 7, 1959 T. T. HUCKABEE 2,893,879
COLD SMOKING FOOD PRODUCTS
Filed Feb. 19, 1958 2 Sheets-Sheet 2
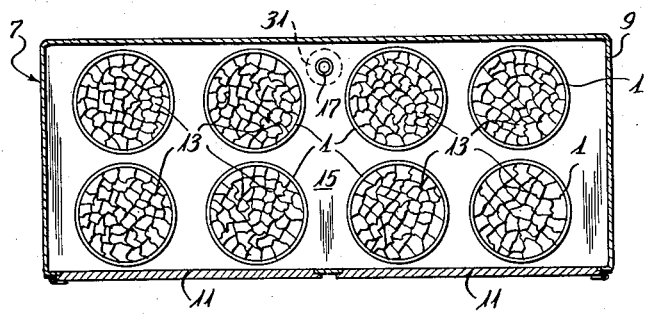
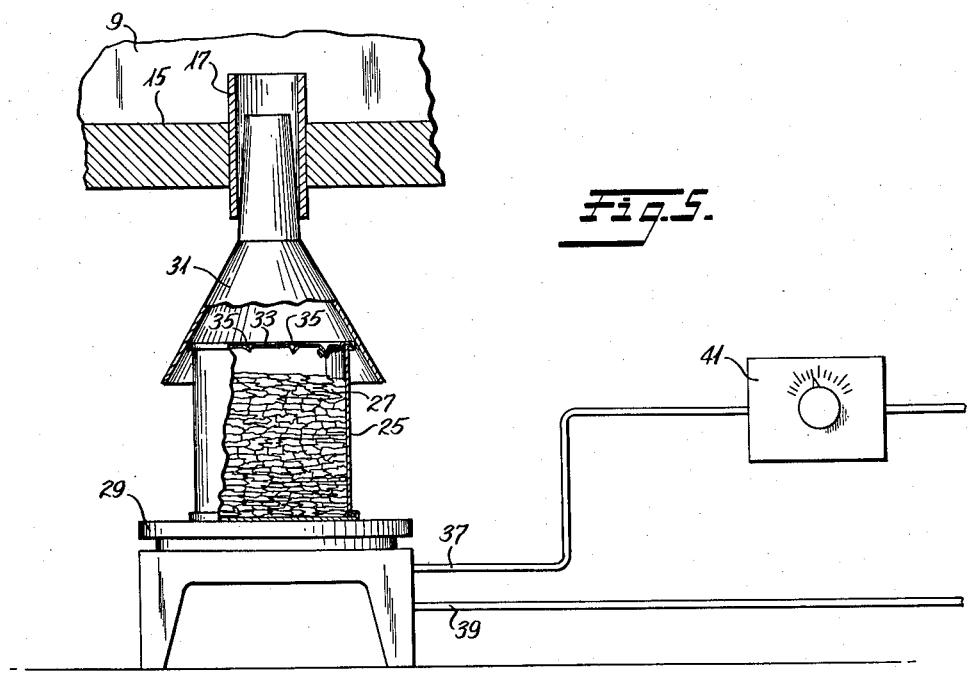
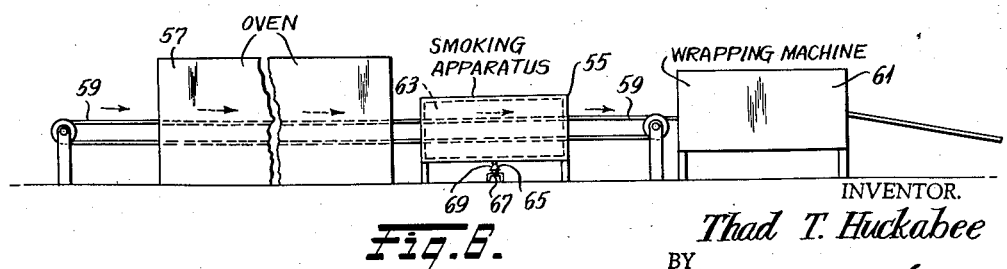
INVENTOR.
Thad T. Huckabee
BY
Bacon & Thomas
ATTORNEYS

United States Patent Office 2,893,879
Patented July 7, 1959

2,893,879

COLD SMOKING FOOD PRODUCTS

Thad T. Huckabee, Albany, Ga.

Application February 19, 1958, Serial No. 716,225

9 Claims. (Cl. 99—229)

The present invention relates to wood-smoke-flavored food products and more particularly to wood-smoke-flavored bread, meat, etc., products. The invention further relates to a process and apparatus for imparting a smoke flavor to food products, generally, and which process and apparatus effect quick smoking of the product by "cold smoke" in a matter of minutes and without loss of the normal moisture from the product during the smoking operation. The "cold smoking" is effected by permitting only smoke to enter the smoking chamber and excluding all external heat and products of combustion.

The present process and apparatus are particularly applicable for use in smoke-flavoring foods, such as fresh bread products, fresh, frozen and non-frozen raw meat, oysters, fish, fowl, etc., and wherein it is desired to preserve the normal moisture content and natural flavor of the product. The present process and apparatus are also useful for effecting quick smoking of stale bread products that have been subjected to a drying operation to substantially completely dehydrate the same for subsequent conversion into smoke-flavored bread crumbs. This cannot be done physically or economically with prior known smoking processes and apparatus that involve long smoking periods and utilize heat during the smoking process to "cure" the product. The presence of heat during the conventional smoking process produces objectionable dehydration of the food, with consequent loss of some, if not all, of the moisture content and natural flavor of the food.

In connection with the smoke-flavoring of meat, it was considered heretofore that raw meat, for example, could not be smoke-flavored except by subjecting it to heat and to a prolonged smoking period to "cure" the meat. It was likewise erroneously considered that it was impossible to smoke-flavor frozen meat and other frozen food products. The present invention has demonstrated the contrary, in that a smoke flavor can be quickly imparted to raw meat, whether frozen or non-frozen, by the present "cold smoke" process, in a matter of minutes, and without significant loss of any of the natural juices of the meat. This is made possible by the present process for the reason that it is carried out in a manner and with apparatus that permits only the smoke to enter a closed smoking chamber and prevents entry of heat from the heat source, which produces the smoke, and also prevents entry of fresh air and moisture so that a very heavy concentration of smoke can be quickly built up and maintained within the smoking chamber.

It will be understood that the word "meat" as used herein includes animal meat as well as oysters, fish, and fowl. The terms "bread" and "bread products" as used herein principally refer to white bread, white rolls, and white buns, but does not exclude wholewheat, graham, and similar baked goods. The term "food product" may include both meat and bread.

The principal object of the invention is to provide, as a new article of commerce, smoke-flavored fresh bread and fresh meat products.

Another object is to provide a process for quickly smoke-flavoring food products without any apparent effect on the moisture content of said products during the smoking operation.

Another object is to provide suitable apparatus for quickly smoke-flavoring food products without impairment of their moisture content.

A further object is to provide a process and apparatus for converting bakery return or stale bread products into a new product in the form of smoke-flavored bread crumbs that afford a new taste treat when used with other foods, or in lieu of conventional bread crumbs or other filler materials.

Other objects and advantages of the invention will be apparent from the following description taken in conjunction with the accompanying drawings, in which:

Fig. 1 is a diagrammatic view of apparatus suitable for making smoked bread crumbs in accordance with the principles of the invention;

Fig. 2 is a front elevational view of apparatus including a smoke chamber suitable for "cold smoking" various food products;

Fig. 3 is a view of the apparatus shown in Fig. 2, but with the doors of the smoke chamber shown in open position;

Fig. 4 is a horizontal sectional view taken on the line 4—4 of Fig. 2;

Fig. 5 is an enlarged fragmentary vertical sectional view through a portion of the base of the smoking apparatus and through a container having a smoke-producing medium therein; and Fig. 6 is a diagrammatic view of apparatus adapted for smoke-flavoring fresh baked products.

One of the important features of the invention is that it may utilize stale bread that cannot be sold in its normal channels of trade, and converts this bread into a desirable and palatable commodity in the form of smoked bread crumbs that can be used to increase the bulk of other food products, such as meat patties, hamburg, meat loaf, turkey stuffing, etc., and impart a new taste flavor thereto. The smoked break crumb product may also be used as part of a batter for oysters, veal cutlet, pork chops, fish, fowl, etc., to impart a smoke flavor thereto. The smoked bread crumbs may also be used directly on cheese in a sandwich to be grilled to impart a smoke flavor thereto.

In the use of stale bread for conversion into smoke-flavored bread crumbs, only intact loaves are used. Moldy bread or bread from which the wrapper has been torn is rejected. The wrapper is removed from wrapped bread and the bread is sorted according to age, and placed in wire baskets and loaded into a dehydrating apparatus to reduce its moisture content. It has been found that too rapid heating of the bread, or heating of the bread to too high a temperature will ruin its flavor by "over toasting."

Most bread is in sliced form, but where solid loaves are returned, they are either sliced or broken into sections to facilitate drying. Fresh bread on the average usually contains about 25% by weight of moisture, which is introduced through water, milk, shortening, eggs, etc., added in the preparation of the dough. According to the present process, the moisture content is preferably reduced to about 2% but, in any event, should not exceed about 10% by weight. If the moisture content of the bread is not reduced to the necessary extent, it becomes stringy when it is pulverized to form bread crumbs.

During the drying process, the moisture at the outer exposed surfaces of the bread slices is evaporated first and the concentration of moisture and shortening occurs at the center of the bread making it appear darker in this area, so that it is possible for a skilled person to discern by inspection whether the bread has been adequately dehydrated.

According to the present process, the bread to be dehydrated is placed in wire baskets 1, Fig. 1, which, in turn, are placed in the drying chamber 3 of a dehydrator 5, (also marked Bread Dryer), and gradually heated up to about 500° F. in 30 minutes and held at this temperature for about 20 minutes. The dryer 5 is allowed to cool for a period of 12 to 15 hours, preferably overnight, and the temperature of the chamber 3 is gradually reduced to about 100° F.

After the bread has been dehydrated, it is removed from the dryer 5 and the wire baskets 1 containing the same are immediately placed in a smoking apparatus 7 (also marked Bread Smoker).

The smoking apparatus 7 is shown in greater detail in Figs. 2 to 5 and comprises a cabinet 9 defining an enclosed zone having doors 11 mounted on the front thereof through which the wire baskets 1 may be inserted. In one operative form of the invention, the cabinet 9 is made large enough to receive eight wire baskets 1, each containing about 9½ to 10 pounds of dehydrated bread 13 so that the total poundage in the cabinet ranges from about 76 to 80 pounds. The wire baskets 1 are about 26 inches high and 10 inches in diameter; whereas, the height of the interior of the cabinet 9 is only slightly greater, namely, 30 inches; its length is about 60 inches and its depth is about 24 inches.

The object of this is to have a minimum of excess space in the cabinet 9 so that a maximum concentration of smoke can be quickly collected therein. It will be noted that eight wire baskets 1 have been shown in Fig. 4. This is merely illustrative, since the size of the cabinet 9 can be varied to accommodate as many baskets 1 as desired.

The cabinet 9 has a bottom wall 15 in which a tube 17 is mounted that provides communication between the interior and exterior of the cabinet. The tube 17 is preferably located about 8 inches from the rear wall of the cabinet. The cabinet 9 has a top wall 19 provided with a vent opening 21 at the rear right corner thereof. This opening is closed by a sliding plate 23.

A metal container 25 is disposed below the bottom wall 15 of the cabinet and is substantially completely filled with hickory wood chips 27. These chips are preferably of a uniform thickness of about 1/16 of an inch, so that when heat is applied to the container 25, smoke will be rapidly produced in great volume. The container 25 is supported exteriorly of the cabinet 9 upon an electric hot plate 29, which is preferably used as a matter of convenience, although it will be understood that a gas or oil burner may be used to heat the container 25, if desired. An inverted funnel-shaped member 31 forms a hood over the upper end of the container 25 and rests upon the rim of the container. The spout of the funnel fits closely in the tube 17. The container 25 has a removable friction top 33 provided with one or more openings 35 through which the smoke formed in the container issues into the mouth of the funnel 31. The openings 35 necessarily limit the access of fresh air to the container 25 so that the chips 27 are charred by the externally applied heat and are caused to produce smoke of heavy concentration.

The electric hot plate 29 is connected with electrical conductors 37 and 39 which supply electrical current thereto. A conventional time control switch 41 is connected in circuit with the hot plate 29 and is adjustable to control the period of time during which the hot plate 29 operates to heat the container 25.

After the bread has been loaded into the smoking chamber the doors 11 are closed and the electric heater 29 is turned on to heat the container 25 and cause the hickory wood chips 27 contained therein to be heated sufficiently to produce smoke. The smoke is conducted from the container 25 through the inverted funnel 31 into the inlet 17 of the smoke chamber. The vent 21 in the top wall 19 of the smoke chamber is opened to enable the smoke entering to displace the fresh air therefrom. The vent 21 is closed by manual movement of the sliding plate 23 as soon as smoke begins to pour through it. The smoke entering the chamber usually rises immediately to the top and starts to build up from the top of the chamber downwardly in layers. The time control switch 41 governs the period during which the electric heating element 29 is in operation and, thus, controls the period of smoke generation.

The length of the smoking period will vary in accordance with the degree of smoke flavor to be imparted to the product in the smoke chamber. For bread and meat products, the introduction of smoke into the smoke chamber for a period of about 8 minutes is preferable for medium smoke flavor; whereas, a period of 5 minutes will impart light smoke flavor. A smoking period of 15 minutes will produce a strong smoke flavor, and a period of 30 minutes, a very strong smoke flavor.

It will be noted that none of the heat from the heating element 29 enters the smoke chamber with the smoke from the container 25, and this results in a more effective and more uniform smoking of the product by "cold smoke." The reason for this is that if heated air and other hot products of combustion are introduced into the chamber along with the smoke, the concentration of smoke is reduced and a certain amount of condensation of moisture from the air would occur, and be absorbed by the dehydrated bread, and this would be undesirable.

As has been indicated, the period during which smoke is introduced into the chamber will vary in accordance with the strength of the smoke flavoring desired to be imparted to the food product. It will be understood that a very heavy concentration of smoke is quickly built up in the smoke chamber and that eventually some of the smoke will tend to flow out of the cabinet around the funnel or out of the funnel itself rather than through the funnel into the smoke chamber. The degree of smoke flavoring can be varied not only by the length of time that the heating element is in operation under the control of the switch 41, but by delaying opening of the cabinet doors 11—11 for two to three minutes, or more, after the operation of the heating element has been discontinued.

It has been found that the temperature of the bread or other product being smoked is not appreciably raised during the "cold smoking" period, usually not more than a few degrees and, in any event, the temperature of the product is not increased sufficiently to cause any further dehydration thereof in the case of bread; or to evaporate appreciable moisture from fresh meat products. Raw, non-frozen steak, for example, can be given a very palatable smoke flavoring after a smoking period of only about 9 minutes and without any noticeable loss of moisture content. Likewise, the temperature of frozen foods being "cold smoked" does not change appreciably within the limit of the smoking interval recommended. Thus, frozen meat to be smoked can be removed from a freezer, unwrapped and placed in the smoking cabinet and smoked without any perceptible thawing. Frozen meats are preferably smoked for about 4 minutes longer than non-frozen meats, to obtain a comparable smoke flavor.

In the case of conversion of smoked bread into bread crumbs, after the desired degree of smoking has been imparted to the dehydrated bread, the baskets 1 are removed from the smoke chamber and their contents fed to a pulverizer 43, Fig. 2 (also marked Bread Grinder). The pulverized material is discharged from the grinder 43 onto a vibrating screen 45. This screen is in the form of a sheet of metal perforated with ⅛ inch diameter holes 47. The crumbs of acceptable size pass through the holes 47 in the screen 45 and enter a hopper 49 and the oversize crumbs drop off the screen into a hopper 51 and are fed back to the grinder 43 as diagrammatically indicated. The hopper 49 discharges the finished smoked bread crumbs into a receptacle 52 from which they are delivered to a conventional container filling and weighing machine 53 (also marked Packaging Machine).

The use of "cold smoke" in the aforedescribed process makes it possible to very quickly impart a smoke flavor to bread and other food products because of the heavy concentration of smoke that can be effected in the chamber without any danger of unduly heating the product being smoked. Another factor which contributes to the smoke concentration and the quick smoking operation is the absence of fresh air in the chamber, which, as has been explained before, is vented from the chamber at the beginning of the smoking process and is prevented from entering the chamber during the smoking period.

The bread crumbs that collect in the receptacle 52 are ready for packaging and may be packed in sealed, top-closed cans, but can be conveniently packed in polyethylene bags, which afford ready access to the product for use. In any event, the cans or bags preserve the smoke-flavor of the product. Smoking of the bread crumb product also serves, incidentally, as a preservative and as a deterrent to insect festation. It will be understood that the packed product may be suitably labelled to indicate the strength of the smoke-flavor imparted to the product by words such as "Light Smoke Flavor," "Medium Smoke Flavor," "Strong Smoke Flavor," and "Extra Strong Smoke Flavor."

The principles of the invention are also useful for smoking fresh bread products and in this connection, Fig. 6 diagrammatically illustrates a smoking apparatus 55 associated with a conventional oven 57. An endless conveyor 59 upon which the bread products are moved is arranged so that it travels through the oven 57 and extends for a substantial distance beyond the discharge end of the oven to a conventional wrapping machine 61. The smoking apparatus 55 is arranged between the discharge end of the oven 57 and the wrapping machine 61, in the path of travel of the conveyor 59, so that the freshly baked products must pass through the smoke chamber 63 of said apparatus. The length of the smoke chamber 63 is coordinated with the speed of the conveyor 59 so that the fresh baked bread, rolls, etc., on said conveyor are subjected to the action of the concentrated smoke in the smoke chamber 63 for the period of time, six to twenty minutes, necessary to impart the desired light or strong smoke flavor to the bread products. Here, again, the smoke-producing means is located exteriorly of the smoke chamber so that only the "cold smoke" issuing from the smoke-producing container 65 enters the smoke chamber 63. This container is similar to the container 25 and any number of containers may be used simultaneously to provide an adequate concentration of smoke in the chamber 63. The container 65 is heated by a hot plate 67 and the smoke thus produced is confined by a funnel-like hood 69 for entry into the smoke chamber 63. Thus, fresh bread and rolls can be smoked immediately after baking and before reaching the conventional bread or roll-wrapping machine 61.

It has been found that smoke-flavored fresh rolls used with hamburgers give the same taste effect as if the hamburger meat had been smoke-flavored, and constitutes a very appetizing product without the addition of flavoring ingredients such as catsup, relish, or condiments.

It will be understood that bread and rolls which were smoked in a fresh state, and which remained unsold, can be subjected to the dehydration treatment described hereinabove and resmoked if desired, and then pulverized to form bread crumbs, so that the smoked fresh product entails no more waste than the unsmoked bread product. In other words, the fresh smoked bread and rolls, when they become stale, need not be discarded but can be dehydrated and pulverized and packaged in the same manner as crumbs made from originally unsmoked bread.

Reverting to the smoke-flavoring of meat, and particularly frozen meat, it has been observed that during the freezing of meat, the moisture in the meat forms ice crystals which physically break down the meat tissue or fibers and make way for the smoke to penetrate the fibers. It has been found that these fibers, as well as the ice crystals, absorb smoke flavor during the "cold smoking" process, so that the frozen meat can be smoke-flavored without first being allowed to thaw out. As the smoked meat is subsequently allowed to thaw for table use, the ice crystals will melt to form juices that are largely absorbed by the meat fibers which thus further retain the smoke flavor in the meat.

In smoking fresh or frozen meats, fish, fowl, or other foods, it is preferable to wrap the same immediately after removal from the smoking cabinet for the reason that such wrapping will aid in retention of the smoke flavor. In this connection, smoke-treated wrapping material is preferably used for wrapping the smoked food product. Such material can be conveniently placed in the smoking cabinet to be smoke-treated at the same time as the food product. The smoked meat is preferably first wrapped in a smoke saturated, i.e., pre-smoked, transparent waxed paper and then wrapped in heavy waxed butcher paper, which may also be pre-smoked, if desired. The final wrapper, may be an attractively decorated aluminum foil. Thus, at least, the inner pre-smoked paper wrapper will insure lasting smoke flavor in that it will not absorb such flavor from the product but will provide smoke flavor that can be absorbed by the product. In the case of frozen meat, the smoked meat product should be permitted to thaw while in at least the smoked wrapper in order to assure uniformity of smoke flavoring and a maximum retention of the natural juices of the meat.

As is well know, it is common practice in the meat tenderizing art to halt the tenderizing process by freezing the meat. Such tenderizing treatment often impairs the flavor of the meat and freezing in no way restores it. Hence, the present process is of tremendous value in adding a very palatable flavor to such off-taste, tenderized meat, thereby rendering it more desirable and acceptable for table use.

Another valuable feature is that meats used in making hamburgers, wieners, sausage, meat loaf, or any other ground or stripped meat can be smoked by the present "cold smoke" process before grinding, thereby assuring uniform smoke-flavoring of the meat particles.

It will be understood that various forms of apparatus may be employed to carry out the principles of the present invention, and that the temperature and period of dehydration and the duration of the period of smoking of the food product may be varied within limits, without departing from the principles of the invention or the scope of the annexed claims.

I claim:

1. In a process for smoke-flavoring a food product, the steps, consisting of: placing the food product to be smoked in an enclosed zone; and introducing cold smoke of heavy concentration into said zone for a period of about 5 to 30 minutes to impart the desired smoke flavor to said food.

2. In a process for smoke-flavoring a food product, the steps, consisting of: placing the food product to be smoked in an enclosed zone; introducing cold smoke of heavy concentration into said zone; venting air from said zone until the zone is completely filled with said smoke; discontinuing said venting and continuing the introduction of said smoke into said zone for a period of about 5 to 30 minutes until the food product has the desired smoke flavor.

3. In a process for smoke flavoring a food product, the steps consisting of: placing the food product to be smoked in an enclosed zone; heating wood chips in a confined space while limiting access of fresh air to said space to produce cold smoke of heavy concentration; and introducing said cold smoke of heavy concentration into said zone for a period of about 5 to 30 minutes to impart the desired smoke flavor to said food.

4. In a process for making smoked bread crumbs, the steps consisting of: dehydrating a bread product to reduce its moisture content to about 2% to 10% by weight; smoking the dehydrated bread product with cold smoke of heavy concentration in an enclosed zone for a period of about 5 to 30 minutes to impart a desired smoke flavor thereto; and pulverizing the smoked bread product to form bread crumbs.

5. In a process of making smoke-flavored bread crumbs from stale bread loaves, the steps consisting of: dividing the bread loaves into sections; dehydrating said sections to reduce their moisture content to about 2% to 10% by weight; subjecting the dehydrated sections to cold smoke of heavy concentration for a period of about 5 to 30 minutes to impart a smoke flavor thereto; and pulverizing the dehydrated, smoke-flavored sections to form bread crumbs.

6. In a process for smoke-flavoring raw meat, the steps consisting of: placing frozen, fresh, raw meat in an enclosed zone at room temperature; and introducing cold smoke of heavy concentration into said zone for a period of about 5 to 30 minutes to impart the desired smoke flavor to said meat.

7. The process defined in claim 6, including the step of enclosing the smoke-flavored meat in pre-smoked wrapping material.

8. In a process for smoke flavoring a food product, the steps consisting of: placing fresh, raw meat to be smoked in an enclosed zone; placing wood chips in a confined space; limiting access of fresh air to said space while applying sufficient heat externally of said space to heat said chips to produce cold smoke of heavy concentration; and introducing said cold smoke of heavy concentration into said zone for a period of about 5 to 30 minutes to impart the desired smoke flavor to said meat.

9. The process defined in claim 8, including the step of enclosing the smoke-flavored meat in pre-smoked wrapping material.

References Cited in the file of this patent

UNITED STATES PATENTS

| | | |
|---|---|---|
| 1,280,772 | Legg | Oct. 8, 1918 |
| 1,765,485 | Hasselblad et al. | June 24, 1930 |
| 2,120,237 | Brenner et al. | June 14, 1938 |
| 2,266,131 | Thon | Dec. 16, 1941 |
| 2,333,505 | Allen | Nov. 2, 1943 |
| 2,338,156 | Allen | Jan. 4, 1944 |
| 2,506,908 | Thompson | May 9, 1950 |
| 2,565,454 | MacKenzie et al. | Aug. 21, 1951 |
| 2,585,799 | Lawrence | Feb. 12, 1952 |